(12) United States Patent  
Childers et al.

(10) Patent No.: US 9,321,222 B2  
(45) Date of Patent: Apr. 26, 2016

(54) OPTICAL FIBER SENSING WITH ENHANCED BACKSCATTERING

(71) Applicants: Brooks A. Childers, Christiansburg, VA (US); Roger Glen Duncan, Christiansburg, VA (US)

(72) Inventors: Brooks A. Childers, Christiansburg, VA (US); Roger Glen Duncan, Christiansburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1 day.

(21) Appl. No.: 14/322,160

(22) Filed: Jul. 2, 2014

(65) Prior Publication Data

US 2015/0048243 A1 Feb. 19, 2015

Related U.S. Application Data

(60) Provisional application No. 61/865,321, filed on Aug. 13, 2013.

(51) Int. Cl.
*G01V 8/16* (2006.01)
*G01V 1/22* (2006.01)
*B29C 71/00* (2006.01)
(Continued)

(52) U.S. Cl.
CPC .............. *B29C 71/00* (2013.01); *E21B 47/123* (2013.01); *G01H 9/004* (2013.01); *G01V 1/226* (2013.01); *B29K 2105/253* (2013.01); *B29K 2995/0018* (2013.01); *B29K 2995/0031* (2013.01); *B29L 2011/00* (2013.01); *B29L 2031/731* (2013.01); *B29L 2031/752* (2013.01)

(58) Field of Classification Search
CPC .......... G01V 8/16; G01V 1/226; B29C 71/00; B29K 2105/253; B29K 2995/0018; B29K 2105/0031; B29L 2011/00; B29L 2031/732; B29L 2031/752; E21B 47/123; G01H 9/004

See application file for complete search history.

(56) References Cited

U.S. PATENT DOCUMENTS 5,303,318 A * 4/1994 Tateda ................ C03B 7/01446  
    385/123  
6,192,713 B1 2/2001 Zhang et al.  
(Continued)

FOREIGN PATENT DOCUMENTS

EP 1615011 A1 1/2006  
JP 10332529 A 12/1998

OTHER PUBLICATIONS

Hsu et al., "Measurement of instrinsic optical backscattering characteristics of cells using fiber-guided near infrared light"; BioMedical Engineering Online 2010, Sep. 1, 2012, 12 pages. http://www.biomedical-engineering-online.com/content/9/1/12.

(Continued)

*Primary Examiner* — Mark R Gaworecki  
(74) *Attorney, Agent, or Firm* — Cantor Colburn LLP

(57) ABSTRACT

An apparatus for estimating at least one parameter in a downhole environment includes: an optical fiber configured to be disposed in a borehole, the optical fiber having a property that causes intrinsic backscattering of signals transmitted therein. The property varies along a length of the optical fiber to generate a variable intensity of the backscattering, the intensity of backscattering varying along the optical fiber as a function of distance from an end of the optical fiber. The apparatus also includes a light source configured to send an optical signal into the optical fiber; and a detector configured to receive a return signal including backscattered signals.

20 Claims, 4 Drawing Sheets

(51) Int. Cl.
*G01H 9/00* (2006.01)
*E21B 47/12* (2012.01)
*B29L 11/00* (2006.01)
*B29L 31/00* (2006.01)
*B29K 105/00* (2006.01)

(56) References Cited

U.S. PATENT DOCUMENTS

| | | | |
|---|---|---|---|
| 6,542,683 B1 * | 4/2003 | Evans | C03B 7/027 |
| | | | 385/127 |
| 7,369,730 B2 | 5/2008 | Childers | |
| 7,650,051 B2 | 1/2010 | Lieberman et al. | |
| 7,946,341 B2 | 5/2011 | Hartog et al. | |
| 8,289,521 B2 | 10/2012 | Blin et al. | |
| 8,437,005 B2 | 5/2013 | Digonnet et al. | |
| 2004/0095569 A1 | 5/2004 | Kan | |
| 2006/0140529 A1 * | 6/2006 | Childers | G02B 6/0208 |
| | | | 385/4 |
| 2010/0025048 A1 | 2/2010 | Franzen et al. | |
| 2010/0200743 A1 | 8/2010 | Forster et al. | |
| 2011/0292763 A1 | 12/2011 | Coates et al. | |
| 2012/0067118 A1 | 3/2012 | Hartog et al. | |
| 2012/0111104 A1 | 5/2012 | Taverner et al. | |
| 2012/0175512 A1 * | 7/2012 | Duncan | E21B 47/123 |
| | | | 250/269.1 |
| 2013/0154632 A1 | 6/2013 | McEwen-King et al. | |
| 2014/0285793 A1 * | 9/2014 | Jaaskelaninen | G01L 1/242 |
| | | | 356/32 |

OTHER PUBLICATIONS

Notification of Transmittal of the International Search Report and the Written Opinion of the International Searching Authority; PCT/US2014/046341;Mailed Nov. 5, 2014; Korean Intellectual Property Office; 14 pages.

* cited by examiner

OPTICAL FIBER SENSING WITH ENHANCED BACKSCATTERING

CROSS-REFERENCE TO RELATED APPLICATIONS

This application claims the benefit of Provisional Application No. 61/865,321 filed Aug. 13, 2013, the disclosure of which is incorporated by reference herein in its entirety.

BACKGROUND

Optical fiber sensors are utilized for various functions including communication and measurements, e.g., to obtain various surface and downhole measurements, such as pressure, temperature, stress and strain.

One loss mechanism in optical fibers is Rayleigh scatter. This very low backscattered signal is the basis of optical time domain reflectometry and other technologies, e.g. distributed acoustics. Due to the low signal levels, detection of signals resulting from such scattering can be difficult, resulting in low signal to noise ratios (SNR).

SUMMARY

An apparatus for estimating at least one parameter in a downhole environment includes: an optical fiber configured to be disposed in a borehole, the optical fiber having a property that causes intrinsic backscattering of signals transmitted therein, the property varying along a length of the optical fiber to generate a variable intensity of the backscattering, the intensity of backscattering varying along the optical fiber as a function of distance along the optical fiber from an end of the optical fiber; a light source configured to send an optical signal into the optical fiber; and a detector configured to receive a return signal including backscattered signals.

A method of manufacturing an apparatus for estimating at least one parameter in a downhole environment includes: drawing an optical fiber from a preform, wherein drawing includes varying a property of the optical fiber to generate a variable intensity of backscattering due to intrinsic scattering of signals transmitted into the optical fiber, the intensity of backscattering varying along the optical fiber as a function of the length of the optical fiber; and disposing a length of the optical fiber at a carrier configured to be disposed in a borehole in an earth formation.

BRIEF DESCRIPTION OF THE DRAWINGS

Referring now to the drawings wherein like elements are numbered alike in the several Figures.

DETAILED DESCRIPTION

Figure 1:
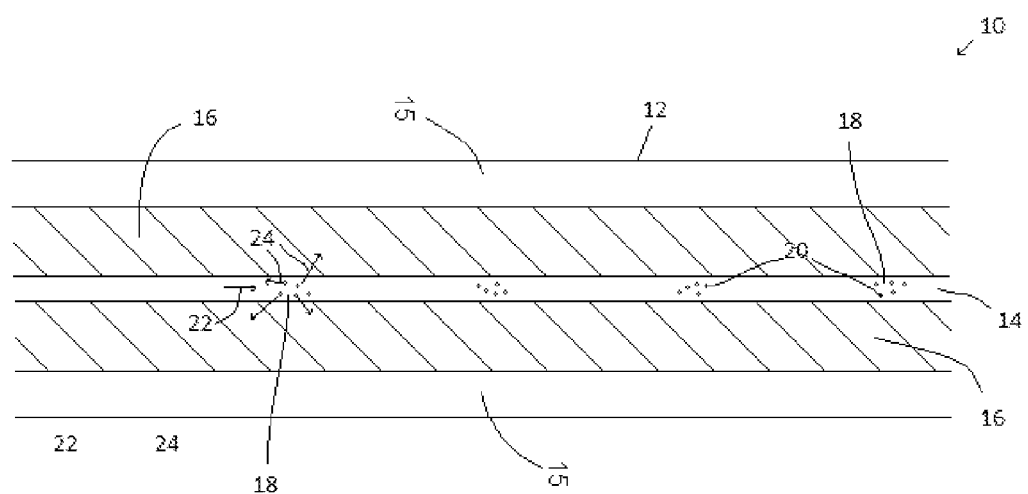
FIG. 1 depicts an exemplary optical fiber sensor.

Referring to FIG. 1, a cross-sectional view of a portion of an embodiment of an optical fiber sensor 10 is shown. The optical fiber sensor 10 includes at least one optical fiber 12 having at least one core 14 and at least one cladding 16. The optical fiber sensor 10 may include a single mode or multi-mode fiber. The core 14 may be made from suitable optically conductive materials including doped or un-doped glasses such as silica glass or quartz. The cladding 16 includes an optically conductive material such as silica glass that may be doped or un-doped. Any suitable optical fibers may be used, such as single core, multi-core, plastic and coreless fibers.

The optical fiber sensor 10 includes a plurality of reflecting or scattering locations 18 disposed along a length of the optical fiber. The scattering locations 18 are configured to reflect and/or scatter optical signals transmitted into the optical fiber 12 by, e.g., an optical interrogator or other light source. In one embodiment, the scattering locations 18 are locations of intrinsic scattering. Locations of intrinsic scattering include points in or lengths along the fiber that reflect transmitted signals, such as Rayleigh scattering.

Rayleigh scattering involves the scattering of light or other electromagnetic radiation from molecules or other particles in the core. An important source of Rayleigh scatter in optical fibers is random fluctuations of the glass (or other fiber material) refractive index. The intensity of the scattering depends on factors including the index of refraction of the core (or other scattering medium). For example, each scattering location 18 includes particles or molecules 20 that may reflect a portion of a transmitted signal 22, causing backscattered signals 24. The return reflected and/or backscattered signals are referred to herein collectively as "reflected signals" or "return signals." Although the scattering locations are described as Rayleigh scattering locations, they are not so limited. Other examples of intrinsic scattering locations that may be used or detected include Brillouin scattering and Raman scattering locations.

It is noted that the scattering locations 18 are not limited to the position and number shown in FIG. 1. Transmitted light may be scattered from any location. In some embodiments, scattered or reflected signals may be generated along various lengths of the core and/or cladding, e.g., at periodic intervals or substantially continuously. In addition, the locations of scattering (e.g., Rayleigh scattering) may not have a scattering location or section with a predefined beginning and end. As such, a scattering location can have a length that is defined as desired to receive scattered signals over some continuous length of the fiber.

The optical fiber 12 has at least one variable property, i.e., a property that varies along a length of the optical fiber, that is configured to control the intensity or amount of backscatter at different locations along the fiber to maximize the SNR while allowing sufficient power to be transmitted over some length of the optical fiber. The reflected or backscattered signals resulting from intrinsic scattering, which are the basis of various sensing technologies such as optical time domain reflectometry (OTDR) and distributed acoustics, may have a very low intensity and low signal to noise ratio (SNR) in typical optical fibers. Embodiments of the optical fiber and optical fiber assembly described herein have one or more properties, e.g., material or structural parameters, that change as a function of distance to increase the intensity and SNR of the backscattered Rayleigh signals.

In one embodiment, the variable optical fiber parameter or parameters are selected or established at the time of manufacture of the fiber or otherwise prior to using the fiber for measurements. For example, characteristics of the core, cladding and/or interface between the core and cladding are varied as a function of length during the fiber drawing process, or during the application of jackets or other materials on the optical fiber. The length of the fiber in this context refers to the distance from an end of the fiber into which signals are transmitted to a location along the fiber.

For example, the optical fiber 12 is doped with a dopant for raising or lowering the index of refraction along the fiber length. The concentration or amount of the dopant may be varied as a function of length. For example, higher concentrations of dopant are present at longer distances away from the beginning of the fiber, i.e., the end of the fiber into which a signal is transmitted. Thus, the distribution of dopants can be created based on fiber length.

Various dopants can be applied to the fiber core and/or cladding during manufacture of the fiber, e.g., during deposition of core or cladding materials on a preform. As the fiber is drawn, the dopant concentration is varied as a desired function of length so that the intensity of backscattering in the optical fiber varies according to the desired function. The core 14, in one embodiment, is doped with one or more of various materials such as germanium (Ge), tin (Sn), phosphorous (P), tantalum (Ta), titanium (Ti), lead (Pb), lanthanum (La), aluminum (Al), Gallium (Ga), antimony (Sb), and any other materials suitable for doping into glass or other core materials. In one embodiment, to achieve an increased core index of refraction, the core is doped with a core dopant such as germanium. The cladding may be a silica glass or other material that is doped with a dopant having the ability to lower the index of the cladding, such as fluorine or boron.

Another way to alter the scattering characteristics of the optical fiber includes UV processing of the fiber during the fiber draw to selectively increase the backscatter level or backscattering intensity in the fiber as a function of length. For example, during the drawing of the fiber, the fiber is exposed to a UV light source such as a lamp or UV laser, which applies varying intensities of the UV light. Exemplary light sources include pulsed laser sources such as nano-second and femto-second pulsed UV lasers. The amount of index change depends on the UV light intensity. The fiber can be an un-doped fiber or be doped with a photosensitive dopant such as Germanium to enhance the index alteration effect. The UV intensity can be controlled during any suitable UV processing technique, such as interference and phase masking.

In one embodiment, the scattering intensity of the optical fiber is controlled by controlling the amount of stress or strain stored in the fiber as a result of the manufacturing process or subsequent coating processes. For example, the fiber can be pre-loaded with residual strain by adjusting parameters of the draw process. The amount of heat, the pull tension, or a ratio between the heat and pull tension can be modified during the draw to provide changes in residual strain in the drawn fiber.

An exemplary method for introducing strain on the optical fiber includes applying one or more coatings to the fiber that induce stress in the fiber by, e.g., increasing the overall load on the fiber. The thickness of such coating is modified along the length to control the backscatter characteristics. In addition, the strain at the core cladding interface can be adjusted, e.g., during preform deposition.

Any of the above properties can be configured individually or in combination to adjust the scattering characteristics of the fiber, e.g., the scattering intensity. The scattering intensity refers to the amount or intensity of the return signal resulting from Rayleigh scattering (or other intrinsic scattering) at some location or length interval.

In one embodiment, the scattering intensity is adjusted as a function of the length of the fiber. Any suitable function may be used to control the scattering intensity. For example, the scattering intensity can be adjusting according to a linear or non-linear relationship between scattering intensity and the length of the optical fiber, e.g. a direct relationship. In one example, the scattering intensity is adjusted according to a function that corrects the exponential increase in loss due to scattering by making the loss linear.

In one embodiment, the scattering intensity is varied randomly so that scattering locations or sections can respond to multiple wavelengths without requiring a precise control of scattering distribution over short lengths. This can be accomplished using a controller having a processor that can randomly change a parameter used in manufacturing or assembling the optical fiber or other components used in conjunction with the optical fiber.

For example, during UV processing, UV light can be applied using a sinusoidal function to vary the UV intensity. The sinusoidal function can be varied randomly, e.g., by randomly varying the phase or amplitude at each time step.

The scattering intensity can be controlled using a selected function that is used as a baseline or mean intensity level around which random variations or fluctuations can be applied. For example, the intensity can be adjusted according to a mean intensity that increases as a function of fiber length (e.g., an exponentially increasing function). The applied intensity is randomly adjusted within some range of the mean intensity to apply random variations to the scattering intensity.

Figure 2:
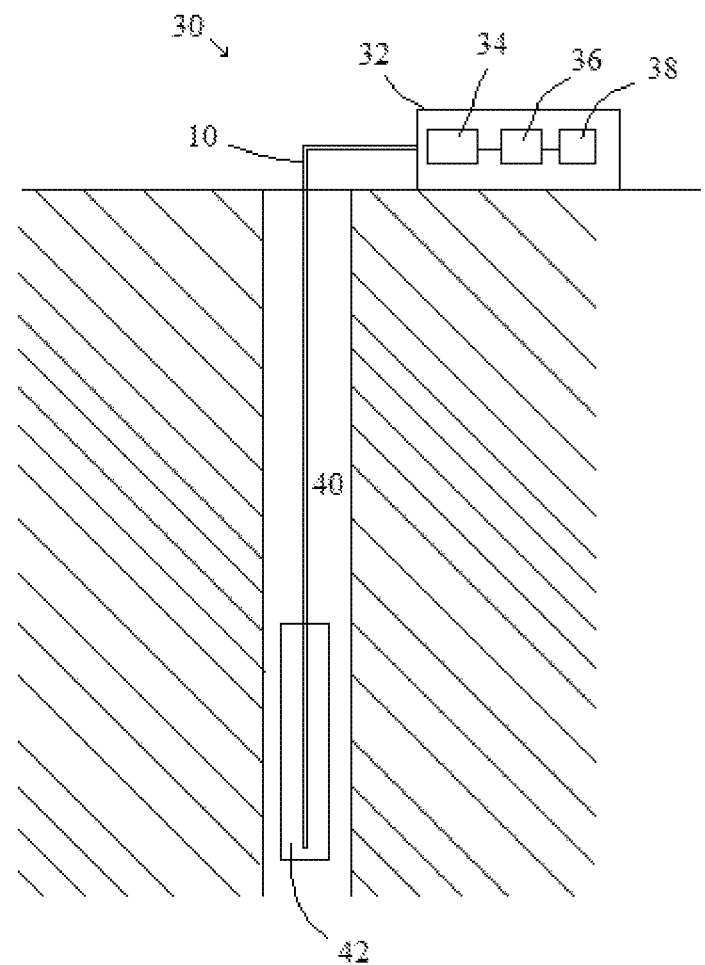
FIG. 2 depicts a downhole measurement apparatus incorporating the optical fiber sensor of FIG. 1.

An example of an application of the optical fiber sensor 10 is shown in FIG. 2, in which a downhole measurement apparatus 30 is illustrated. The downhole measurement apparatus 30 is configured to measure various downhole parameters, such as strain, stress, temperature and pressure. The apparatus 30 includes a surface measurement unit 32 and at least one optical fiber sensor 10 including a plurality of scattering locations 18 such as Rayleigh scattering locations distributed along a length of the optical fiber sensor 10. As discussed above, the scattering locations 18 provide a scattering intensity that varies with length, and may also have random variations.

The surface measurement unit 32 includes a tunable laser 34 or other light source (e.g., a phase-OTDR source), a detector 36 and a processing unit 38. The detector 36 may be any suitable type of photodetector such as a diode assembly. The detector 36 is configured to receive return signals reflected from the scattering locations 18 and generate measurement data.

The optical fiber sensor 10 is configured to be disposed in a borehole 40 and extend along a desired length of the borehole 40. Exemplary parameters that can be measured using the optical fiber sensor include temperature, strain, pressure, position, shape and vibration. The optical fiber sensor may be configured as and/or part of any of a variety of measurement apparatuses or systems. For example, the optical fiber sensor 10 may be configured as a temperature sensor, a strain sensor, a distributed temperature sensor (DTS), an interferometer, an optical frequency-domain reflectometry (OFDR) or optical time-domain reflectometry (OTDR) sensor, and a distributed sensing system (DSS).

In one embodiment, the optical fiber sensor 10 is disposed on or in relation to a carrier or tool 42, such as a drill string segment, downhole tool or bottomhole assembly. As described herein, a "carrier" refers to any structure suitable for being lowered into a wellbore or for connecting a drill or downhole tool to the surface, and is not limited to the structure and configuration described herein. Examples of carriers include casing pipes, wirelines, wireline sondes, slickline sondes, drop shots, downhole subs, BHA's, drill string inserts, modules, internal housings and substrate portions thereof.

For example, the optical fiber sensor may be disposed as part of a wireline cable, a wired pipe or any other type of borehole string, such as a drill string, a borehole completion, a production string or a stimulation assembly. The optical fiber sensor can be, for example, adhered or otherwise attached to a surface or interior portion of the borehole string to measure temperature, strain (e.g., axial, bending or torsional strain) or vibration of the string. In other examples, a length of the optical fiber sensor is exposed or otherwise operably connected to a sampling device or sample reservoir for evaluation of downhole fluids or other materials.

The apparatus 30 may be used in conjunction with methods for estimating various parameters of a borehole environment and/or downhole components. For example, a method includes disposing the optical fiber sensor 10 and/or the carrier 42 downhole, emitting a measurement signal from the laser 34 and propagating the signal through the optical fiber 10. The scattering locations 18 reflect a portion of the signal back to the surface unit 32 through the optical fiber sensor 10. The wavelength of this return signal is shifted relative to the measurement signal due to parameters such as strain and temperature. The return signal is received by the surface unit 32 and is analyzed to estimate desired parameters.

In one embodiment, the optical fiber sensor is incorporated in a monitoring system configured as an optical time-domain reflectometry (OTDR) system. The OTDR monitoring system measures the fraction of light that is reflected back due to, for example, Rayleigh scattering and Fresnel reflection. By comparing the amount of light scattered back at different times, the monitoring system can determine conditions such as fiber and connection losses and can also be used to correlate measurement signals with depth. In one example, phase-OTDRs can be used to make distributed acoustic measurements by using a coherent source and monitoring the variation in phase from pulse to pulse.

In one embodiment, the optical fiber sensor, the apparatus 30 and/or components thereof include devices as necessary to provide for storing and/or processing data. Exemplary devices include, without limitation, at least one processor, storage, memory, input device, communications adapter, optical fiber coupler, splice box, output devices and the like.

As described herein, an "optical fiber sensor" may refer to a single optical fiber having measurement units disposed therein, and may also refer to multiple optical fibers. Various other components may be considered a part of an "optical fiber sensor", such as jackets, protective coverings, strength members, cable components, insulating materials and others.

Figure 3:
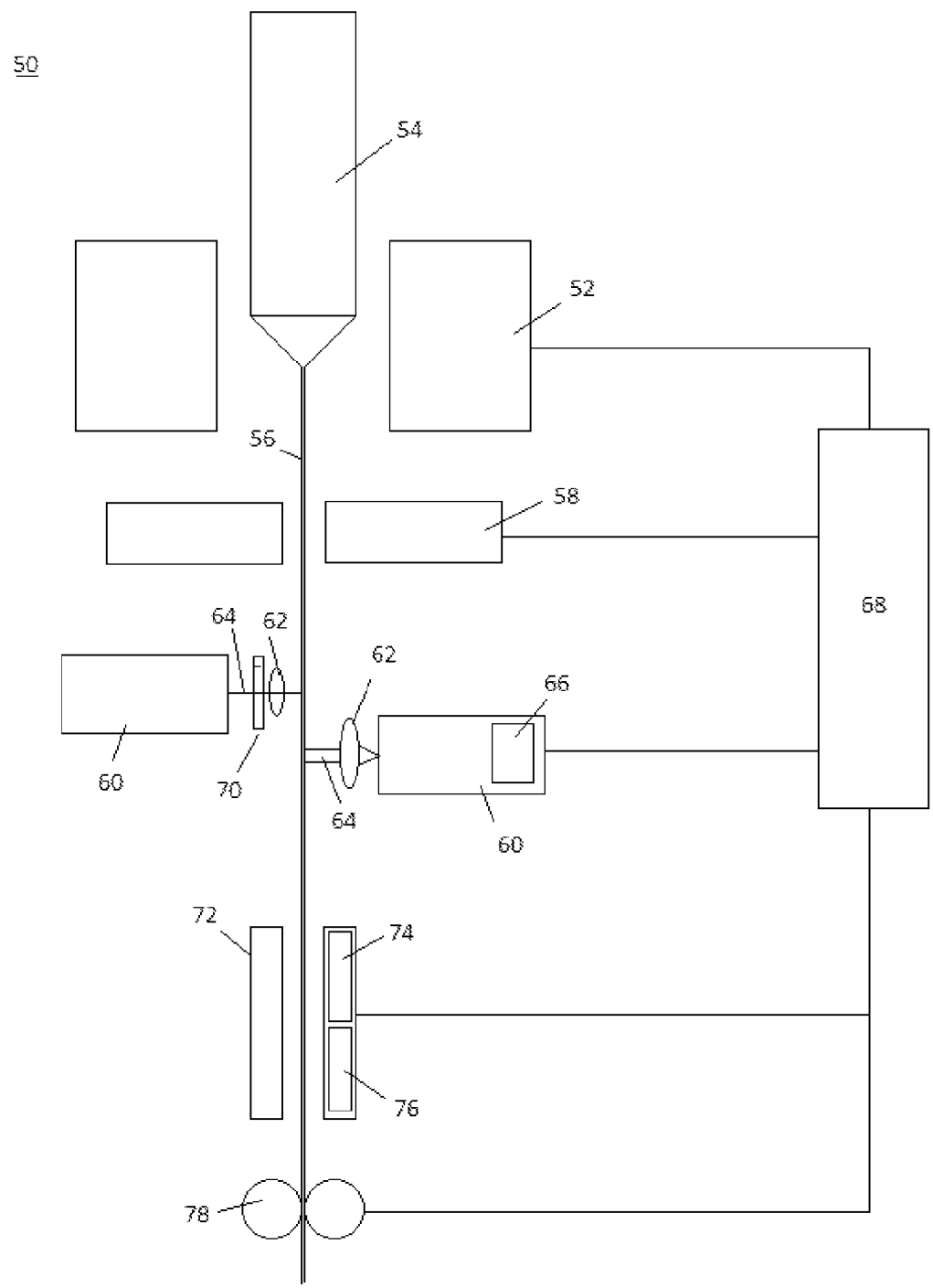
FIG. 3 illustrates an exemplary apparatus for manufacturing the optical fiber sensor of FIG. 1.

FIG. 3 shows an embodiment of a system or apparatus 50 for manufacturing an optical fiber and/or optical fiber assembly. The system 50 includes a support structure and a furnace 52 or other heat source configured to apply heat to a preform 54 to allow the preform to be drawn into an optical fiber 56. The preform may be manufactured using any suitable device or technique, such as chemical vapor deposition (CVD) devices and techniques.

An optional cooling mechanism or other temperature controller 58 may be disposed along the optical fiber 56 to cool the fiber 56 as desired. An exemplary mechanism applies a gas at a controlled temperature to the fiber as it is drawn past the mechanism. The furnace 52 and/or temperature controller 58 can be controlled to modify the temperature of the fiber. This can be used to change the scattering characteristics along the fiber.

Additional components of the apparatus may be included to add additional features such as reflectors and coatings, and/or to add or adjust backscattering features or characteristics of the optical fiber. For example, one or more light sources 60, such as UV lasers, are directed toward the optical fiber 56 during drawing. A lens and/or collimator assembly 62 may be included to control application of an applied beam 64 to apply radiation to a location or an interval and adjust scattering intensity. The light source can be adjusted by a suitable beam modulator 66 controlled by a processing device such as a control unit 68. In one example, a stationary or rotating phase mask 70 is included for imparting a modulation pattern to the fiber 56. The beam can be applied using a variable beam characteristic (e.g., intensity or wavelength) that changes as a function of distance or time to impart a variable scattering intensity along the fiber. The beam characteristic can be an oscillating characteristic such as a sinusoidal amplitude modulation that has a random fluctuation, e.g., randomly fluctuating amplitude or phase of the sine function. The exposure may be continuous or periodic. For example, the beam can be applied periodically using selected pulse lengths, which may be randomly varied.

Another exemplary component is a coating or jacketing assembly 72. Exemplary coating materials include polyamide, acrylate, silicone, polyurethane and PVC. The coating thickness may be varied as the fiber advances to provide a variable load on the fiber when deployed, which will result in variable scattering characteristics as a function of length. Operational parameters can be adjusted to adjust the thickness or density of the coating. For example, the coating assembly 72 includes an application component such as a spray device 74 for applying a liquid coating material to the fiber. A curing component such as a UV laser 76 may be included to cure and harden the coating.

Another exemplary device is a tensioning device 78 configured to control the velocity or draw rate of the fiber. The tensioning device can be used to adjust the speed at which the fiber is drawn, which in conjunction with the fiber temperature (as controlled by the furnace 52 and/or controller 58), can be used to adjust the scattering intensity of the fiber.

In one embodiment, the manufacturing assembly is coupled in communication with the control unit 68 that is connected to one or more of the components to control operational parameters of the manufacturing process. The control unit includes devices as necessary to provide for communicating with and controlling various components, as well as for storing and/or processing data. Exemplary devices include, without limitation, at least one processor, storage, memory, input device, communications adapter, optical fiber coupler, splice box, output devices and the like.

DETAILED DESCRIPTION

Figure 4:
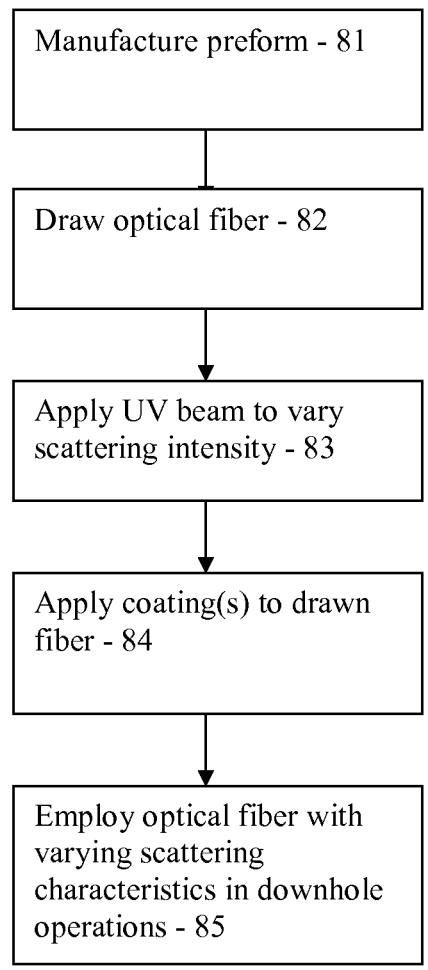
FIG. 4 is a flow chart illustrating an exemplary method of manufacturing an optical fiber and/or performing downhole operations.

FIG. 4 illustrates a method 80 of manufacturing an optical fiber sensor and/or performing measurements using the optical fiber sensor. Although the method 80 is described in conjunction with the optical fiber assembly 10, the apparatus 30 and/or the manufacturing apparatus 50, it is not so limited. The method 80 includes one or more stages 81-85. In one embodiment, the method 80 includes the execution of all of stages 81-85 in the order described. However, certain stages may be omitted, stages may be added, or the order of the stages changed.

In the first stage 81, an optical fiber preform is manufactured utilizing any of a variety of suitable methods. Such methods include deposition methods such as chemical vapor deposition (CVD), modified chemical vapor deposition (MCVD), plasma chemical vapor deposition (PCVD), vapor-phase axial deposition (VAD) and outside vapor deposition (OVD).

In one embodiment, the preform is manufactured by positioning a preform structure (e.g., a silica glass tube). A first gas mixture including, for example, oxygen and silicon tetrachloride ($SiCl_4$), is injected into the interior of the tube and passed through the tube to form a cladding layer. The first gas mixture may include a desired concentration of a dopant. Heat is applied to cause a layer of soot, which is then sintered to form a cladding layer. This is repeated until a desired cladding thickness is reached.

After the cladding is performed, a second gas mixture including desired dopants is passed through the tube and heated to form a layer of soot and then heated again to form a core layer. This process is repeated until a desired core thickness is reached. The entire preform tube is then collapsed to form the preform.

During deposition of the core and/or cladding layers, operational parameters may be adjusted to vary the scattering characteristics along the length of the fiber. For example, as a heater is advanced along the tube during formation of a soot layer, the concentration of dopants in the corresponding gas mixture is varied. The dopant concentration may be increased using any suitable function as the layer is formed along the tube. In addition, the concentration may be varied in a random manner as the layer is deposited so that the dopant concentration varies randomly along the length of the preform.

In the second stage 82, the preform is positioned in the furnace 52 or other heat source, and the fiber is drawn from the preform. The temperature and draw rate can be adjusted during the drawing by, e.g., the furnace 52, the cooling mechanism 58 and/or the tensioning device 78. The control unit 68 adjusts the temperature and/or draw speed to pre-load strain into the fiber. For example, at or near the beginning of the draw process, the fiber is drawn at a relatively high temperature and relatively low speed so that the strain is relatively low. As time passes, corresponding to increasing length of the fiber, the temperature is lowered and/or the speed is increased to increase the strain. The strain is increased according to some function. In addition, the control unit 68 may apply random variations to the temperature and/or draw speed (e.g., within selected ranges) to impart a random variation to the strain in the fiber.

In the third stage 83, a UV laser beam or other electromagnetic radiation source is applied to the fiber to modify the index of refraction of the core and/or cladding, or to introduce imperfections or damage that would increase the intrinsic scattering intensity. This can be accomplished, for example, by increasing the beam intensity as time passes and the fiber length increases. In another example, a sinusoidal or other oscillation in the index as a function of length is applied by modulating the beam via, e.g., the modulator 66 and/or the phase mask 70. In addition, random variations to intensity of the beam (or random variations to the function or periodic function) are applied so that there is a random fluctuation in the index and/or scattering intensity.

In the fourth stage 84, one or more coatings are applied to the fiber. For example, the coating assembly 72 applies a liquid layer of coating material to the fiber that is subsequently cured. The thickness of the coating can be adjusted during the draw to vary the scattering intensity as described above.

In the fifth stage 85, the manufactured optical fiber is employed for various applications, such as downhole communication and/or measurement operations. The optical fiber can be utilized with a carrier such as a drill string or wireline to provide communication between various components and/or to provide sensing capability. Various measurements may be performed during the downhole operation, such as temperature, pressure, deformation, vibration and others. Rayleigh scattering or other intrinsic scattering measurement techniques may be employed to, e.g., correlate measurement signals with fiber location or depth and monitor signal attenuation and fiber condition.

The optical fibers, apparatuses and methods described herein provide various advantages over existing methods and devices. The optical fibers described herein can be used to compensate for increased loss at longer fiber lengths while preserving acceptable SNR associated with received signals. Varying the scattering intensity as a function of distance or fiber length allows for selective increases in backscattering intensity to enhance or optimize return signals along the entire length of a fiber or along a length of interest of the fiber.

In connection with the teachings herein, various analyses and/or analytical components may be used, including digital and/or analog systems. The apparatus may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. An apparatus for estimating at least one parameter in a downhole environment comprising:
   an optical fiber configured to be disposed in a borehole, the optical fiber having a property that causes intrinsic backscattering of signals transmitted therein, the property varying along a length of the optical fiber to generate a variable intensity of the backscattering, the intensity of backscattering increasing along a length of the optical fiber as a function of distance from an end of the optical fiber, a value of the intensity increasing with increasing distance from the end of the optical fiber;
   a light source configured to send an optical signal into the optical fiber; and
   a detector configured to receive a return signal including backscattered signals.

2. The apparatus of claim 1, wherein the intensity of the backscattering is randomly varied around the value of the intensity and within a selected range of the value of the intensity.

3. The apparatus of claim 1, wherein the intrinsic backscattering is caused by Rayleigh scattering.

4. The apparatus of claim 1, wherein the intensity of the backscattering is a mean intensity that increases as a function of fiber length according to an exponentially increasing function.

5. The apparatus of claim 1, wherein the property is a concentration of a dopant in at least one of a core and a cladding of the optical fiber, the concentration varying as a function of the distance.

6. The apparatus of claim 1, wherein the intensity increases along the length by an amount corresponding to an exponential increase in loss due to scattering as a function of distance.

7. The apparatus of claim 1, wherein the property is an amount of residual strain on the optical fiber, the amount varying as a function of the distance.

8. The apparatus of claim 7, wherein the optical fiber includes at least one coating surrounding a core and cladding of the optical fiber, the coating configured to induce the variable residual strain.

9. The apparatus of claim 8, wherein a thickness of the coating varies along the optical fiber to apply a variable load on the optical fiber.

10. A method of manufacturing an apparatus for estimating at least one parameter in a downhole environment, the method comprising:
    drawing an optical fiber from a preform, wherein drawing includes varying a property of the optical fiber to generate a variable intensity of backscattering due to intrinsic scattering of signals transmitted into the optical fiber, the intensity of backscattering increasing along a length of the optical fiber as a function of the length of the optical fiber, a value of the intensity increasing with increasing distance from the end of the optical fiber; and
    disposing a length of the optical fiber at a carrier configured to be disposed in a borehole in an earth formation.

11. The method of claim 10, wherein the intensity of backscattering is randomly varied around the value of the intensity and within a selected range of the value of the intensity.

12. The method of claim 10, wherein the intrinsic backscattering is caused by Rayleigh scattering.

13. The method of claim 10, wherein the intensity of the backscattering is a mean intensity that increases as a function of fiber length according to an exponentially increasing function.

14. The method of claim 10, wherein the property is a concentration of a dopant in at least one of a core and a cladding of the optical fiber, the concentration varying as a function of the length.

15. The method of claim 10, wherein the property is an index of refraction of the optical fiber, the index of refraction varying as a function of the length.

16. The method of claim 15, wherein drawing includes applying ultraviolet radiation to the optical fiber, the ultraviolet radiation intensity applied to the fiber varying as a function of the length.

17. The method of claim 10, wherein the property is an amount of residual strain on the optical fiber, the amount of residual strain varying as a function of the length.

18. The method of claim 17, wherein drawing includes varying a draw parameter during the drawing to induce the residual strain on the optical fiber.

19. The method of claim 18, wherein the draw parameter is selected from at least one of an amount of heat applied to the preform, a pull tension, and a ratio between the amount of heat and the pull tension.

20. The method of claim 17, wherein drawing includes applying a coating to the optical fiber, the thickness of the coating varying as a function of the length.

* * * * *